April 25, 1950     D. L. MILLER     2,505,334
ENGINE STARTING MECHANISM
Filed Feb. 15, 1946
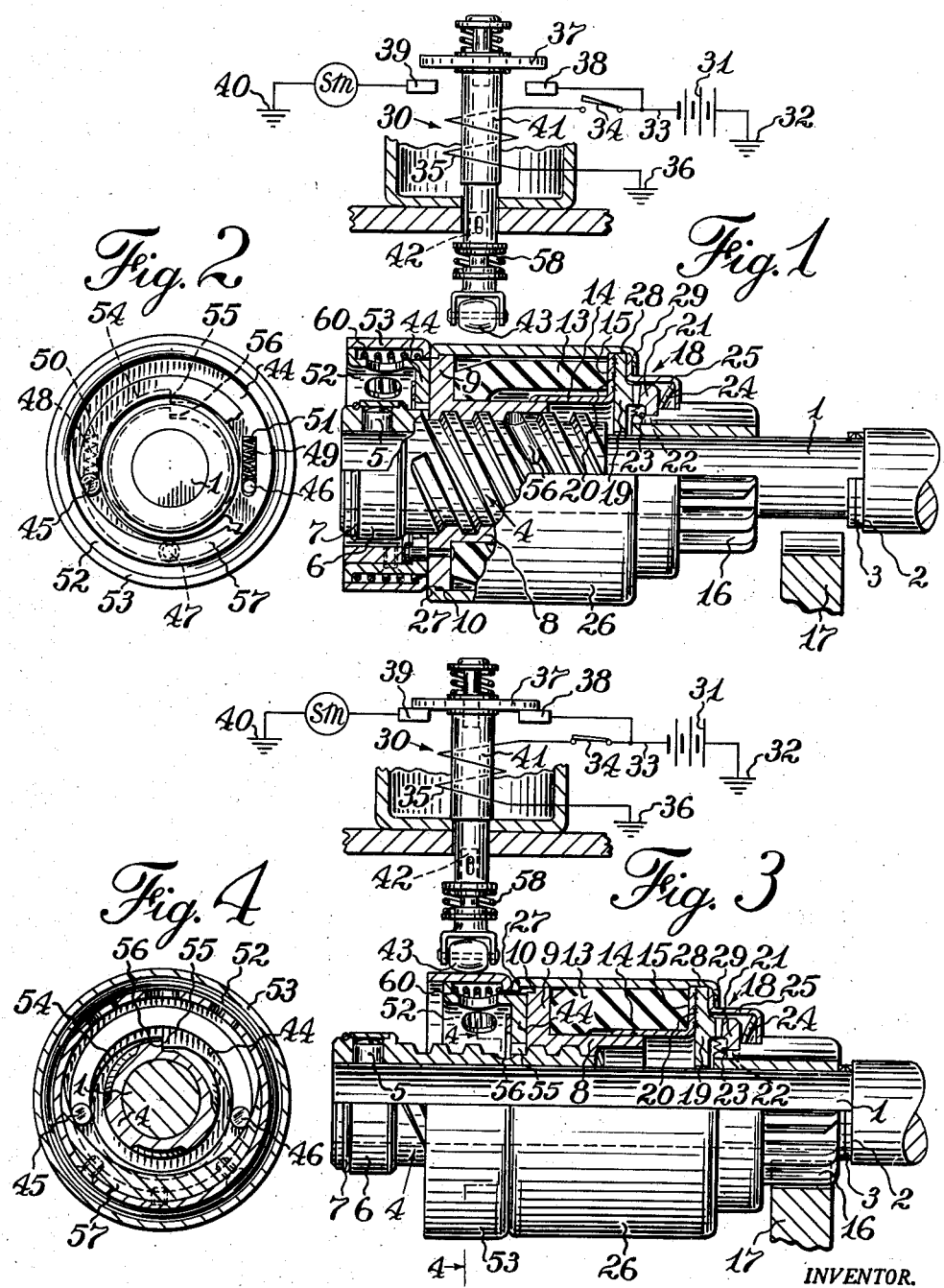
INVENTOR.
Donald L. Miller
BY
Clinton A. James
ATTORNEY
WITNESS:
Esther M. Stockton Patented Apr. 25, 1950

2,505,334

UNITED STATES PATENT OFFICE 2,505,334

ENGINE STARTING MECHANISM

Donald L. Miller, Pine City, N. Y., assignor to Bendix Aviation Corporation, a corporation of Delaware Application February 15, 1946, Serial No. 647,828

4 Claims. (Cl. 74—7)

The present invention relates to an engine starting mechanism and more particularly to that type of starter drive which maintains its operative engagement with the engine until reliable self-operation thereof is secured.

It is an object of the present invention to provide a novel engine starter mechanism of the above type which is simple and easy to assemble and install.

It is a further object to provide such a device including a locking mechanism for prolonging the engagement of the engine engaging member with the engine until the operator acts to terminate the cranking operation.

It is a further object to provide such a device having a plunger controlled by the starting switch and bearing on the starter drive during cranking, with means on the drive cooperating with the plunger to lock the engine engaging member in operative position.

Further objects and advantages will be apparent to those skilled in this art by reference to the following specification and the accompanying drawing, in which:

Fig. 1 is a side elevation partly in section of a preferred form of the present invention, shown in idle or disengaged position;

Fig. 2 is an end view of the drive from the left in Fig. 1;

Fig. 3 is a view similar to Fig. 1 showing the starter drive in operative position; and Fig. 4 is a section taken substantially on the line 4—4 of Fig. 3.

In Fig. 1 of the drawing, there is shown a power shaft 1 which may be the extended armature shaft of a starting motor not illustrated, having a shoulder 2 and a pair of thrust washers 3 placed thereon. An actuating member in the form of a screw shaft 4 is anchored on said power shaft by any suitable means such as an anchor pin 5 which is held in its proper location by a cylindrical ring 6 and a spring lock ring 7. A control member in the form of a nut 8, having a flange 9 at one end with a radial shoulder 10 thereon, is threaded on the screw shaft 4 and a yielding driving member 13 in the form of a cylindrical block of any suitable material such as rubber is seated on the control nut against the flange 9. In order to assist in excluding undesirable foreign material from the threads of the screw shaft and control nut, a thimble 14 having a radial surface 15 is telescoped over the control nut 8.

An engine driving member in the form of a pinion 16 is slidably journalled on the power shaft 1 in position to engage and drive an engine member such as a gear 17, and means are provided for driving the pinion 16 from the control nut 8 including the yielding driving member 13 and an overrunning clutch 18. Clutch 18 comprises a driving clutch plate 19 rotatably mounted on shaft 1 and fixed to thimble 14 by any suitable means such as welding as indicated at 20, and a driven plate 21 which is non-rotatably mounted on the rear of pinion 16 by lugs 22 and held thereon by a lock wire 23. Clutch plate 21 is held in engagement with clutch plate 19 by a dished spring 24 bearing at its inner edge against the plate 21 and at its outer edge against a clutch housing member 25. A casing member or barrel 26 having a narrow flange 27 at its rear end bearing against the shoulder 10 of control nut 8 encloses the resilient member 13 and unifies the clutch parts. For this purpose, the outer edges of the thimble flange 15, plate 19 and clutch housing member 25 are fixedly clamped in a recess 28 at the forward end of the barrel 26 by suitable means such as crimping as indicated at 29.

According to the present invention, means are provided for locking the pinion 16 in mesh with the engine gear 17 as long as the starting switch is closed, this means being in the form of a normally inoperative latching device and a plunger actuated by a magnetic starting switch to render the latch operative. The starting switch indicated generally by numeral 30 is controlled by a circuit comprising a battery 31 grounded at 32 and connected by lead 33 through a manual switch 34 to the switch solenoid 35 which is grounded at 36 to complete the control circuit. Closure of the control circuit energizes the solenoid 35 which pulls down the core 41 causing the engagement of bridging contact 37 with contacts 38 and 39 to complete a cranking circuit therethrough to the starting motor SM which is grounded at 40. The solenoid core 41 has an extension 42 slidably mounted thereon and carrying on its lower end a roller 43 in close proximity to the casing 26, the arrangement being such that when the starting switch 30 is closed the roller bears firmly on the periphery of the casing.

A normally inoperative latch ring member 44 is attached to the rear face of the radial flange 9 by any suitable means such as studs 45, 46 and 47 anchored in the control nut 8. The latch 44 is biased to inoperative position by springs 48, 49 seated within elongated slots 50 and 51 in the latch. A cylindrical extension 52 is provided on latch 44 on which a loose contact ring 53 is slidably journalled. The bore 54 of the latch is eccentric with reference to the outside diameter thereof and a spur 55 is formed therein to cooperate with a notch 56 in the exterior of the screw shaft in position to engage and lock the pinion 16 in mesh with the engine gear 17 when the outer periphery of the latch is concentric with the axis of shaft 1. The latch member 44 is preferably so designed as to its center of gravity that rotation of the latch causes it to be held in engaged position by centrifugal force, as best shown in Fig. 4.

In operation, closure of the manual switch 34 causes actuation of the solenoid switch 30 to move the roller 43 into firm engagement with the casing 26. Simultaneously, the motor SM rotates the power shaft 1 and the screw shaft 4 to traverse the pinion 16 and its associated parts into engaged position against the thrust washers 3. During the traversal of the casing 26, the roller 43 rides up over the loose control ring 53 and the pressure imparted by the solenoid 30 through the plunger spring 58 to the latch 44 causes it to move into concentric position against the resistance of springs 48 and 49 so as to engage the spur 55 of the latch in the notch 56 in the screw shaft. When the engine starts, the pinion 16 is accelerated to a high speed but cannot demesh from the engine gear as long as the manual switch 34 is closed, since the latch prevents retraction of the control nut 8 further than the distance necessary to permit overrunning of the clutch 18. In this way, the pinion 16 is maintained substantially in full mesh with the flywheel 17 even though the engine impulses are sporadic or isolated. At this time, the centrifugal effect on the eccentric mass 57 of the latch 44 aids the plunger 41 in holding the latch in locking position so as to seat the spur 55 in the notch 56. As soon as the operator opens the switch 34, the cranking circuit through the switch 37, 38, 39 is opened thus deenergizing the starting motor, and raising the plunger 41. When the shaft 1 has slowed down sufficiently, the springs 48, 49 overcome the effect of centrifugal force on the latch 44 and move it into disengaged position. The pinion and its associated parts are then free to move back to idle position under the influence of the overrunning torque transmitted from the pinion through the clutch 18 and the yielding coupling member 13 to the control nut 8.

During the cranking operation, the elastic coupling block 13 is compressed between the flange 9 of control nut 8 and the flange 15 of thimble 14 as shown in Fig. 3. The consequent telescoping movement of the latch member 44 within the barrel 26 makes it desirable to form the latch member in two parts, the portion formed by the contact ring 53 having a sliding bearing on the extension 52 of the inner portion, and the two parts being connected by the light compression spring 60. The term "latch member" as used in the appended claims is accordingly intended to apply to the composite member 44, 53 as described.

Although but one embodiment of the invention has been shown and described in detail, it will be understood that other forms of the invention are possible and changes may be made in the proportions and arrangement of the parts without departing from the spirit of the invention as defined in the appended claims.

What is claimed is:

1. In an engine starter drive, a power shaft, a pinion slidably journalled thereon for movement into and out of mesh with a gear of an engine to be started, means for traversing and rotating the pinion including a control member having an inclined connection with the power shaft, a latch member mounted to rotate with the control member and movable into position to prevent demeshing movement of the pinion, yielding means normally holding the latch member in inoperative position, an electro-magnetic starting switch including a movable plunger and means actuated by said plunger upon closure of the starting switch for engaging and moving the latch member into operative position.

2. In an engine starter drive, a power shaft, a pinion slidably journalled thereon, for longitudinal movement into and out of mesh with a gear of an engine to be started, means actuated by the shaft for traversing and rotating the pinion including an overrunning clutch, a circular latch member mounted for rotation on the shaft and for radial movement thereon into and out of operative position, means cooperating with the latch member for holding the pinion in mesh with the engine gear when the latch member is concentric with the shaft, yielding means normally moving the latch member into eccentric released position, a starting switch including a movable plunger, and means yieldably mounted on said plunger movable by closure of the switch into engagement with the periphery of the latch member so as to centralize the latch member with respect to the drive, and maintain it in operative position during actuation of the drive.

3. An engine starter drive as set forth in claim 2 in which the latch member is so formed that centrifugal force holds it in operative position during high speed rotation of the drive.

4. In an engine starter drive, a power shaft, a pinion slidably journalled thereon for movement into and out of mesh with a gear of an engine to be started, means for traversing and rotating the pinion including a control member having an inclined connection with the power shaft, a latch member mounted to rotate with the control member and movable into position to prevent demeshing movement of the pinion, yielding means normally holding the latch member in inoperative position, means for actuating the power shaft including a manually-controlled electro-magnetic starting switch having a movable plunger, means movable into engagement with the latch member and cooperating therewith on rotation of the drive to overcome said yielding means and move the latch member into operative position, and means actuated by said plunger upon closure of the starting switch for causing the engagement of said movable means with the latch member.

DONALD L. MILLER.

REFERENCES CITED

The following references are of record in the file of this patent:

UNITED STATES PATENTS

| Number | Name | Date |
| --- | --- | --- |
| 2,332,055 | Buxton | Oct. 19, 1943 |
| 2,394,690 | Hood | Feb. 12, 1946 |